US010222953B2

(12) United States Patent
Vesco (10) Patent No.: US 10,222,953 B2
(45) Date of Patent: Mar. 5, 2019

(54) SYSTEMS AND METHODS FOR EDITING VIRTUAL CONTENT OF A VIRTUAL SPACE

(71) Applicant: Disney Enterprises, Inc., Burbank, CA (US)

(72) Inventor: Benjamin Vesco, Springfield, OR (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/266,714

(22) Filed: Apr. 30, 2014

(65) Prior Publication Data

US 2015/0317040 A1   Nov. 5, 2015

(51) Int. Cl.

| | |
|---|---|
| *G06F 9/44* | (2018.01) |
| *G06F 3/0484* | (2013.01) |
| *G06F 17/24* | (2006.01) |
| *A63F 13/60* | (2014.01) |
| *A63F 13/533* | (2014.01) |
| *G06F 8/30* | (2018.01) |
| *G06T 15/00* | (2011.01) |
| *G06T 17/00* | (2006.01) |
| *A63F 13/63* | (2014.01) |

(52) U.S. Cl.
CPC ........ *G06F 3/04842* (2013.01); *A63F 13/533* (2014.09); *A63F 13/60* (2014.09); *G06F 17/24* (2013.01); *A63F 13/63* (2014.09); *G06F 3/04847* (2013.01); *G06F 8/30* (2013.01); *G06T 15/00* (2013.01); *G06T 17/00* (2013.01)

(58) Field of Classification Search
None
See application file for complete search history.

(56) References Cited

U.S. PATENT DOCUMENTS 5,360,971 A * 11/1994 Kaufman ............... A61B 3/113
                                                     250/221
5,446,834 A *  8/1995 Deering ............. G02B 27/0093
                                                     345/427
5,999,944 A * 12/1999 Lipkin .............. G06F 17/30572
(Continued)

OTHER PUBLICATIONS

Beier,Klaus-Peter. "Web-based virtual reality in design and manufacturing applications." Proceedings of COMPIT. 2000. (Year: 2000).*

(Continued)

*Primary Examiner* — Matthew J Brophy
(74) *Attorney, Agent, or Firm* — Esplin & Associates, PC (57) ABSTRACT

A system for editing virtual content of a virtual space. The system may include a host server comprising one or more physical processors configured to effectuate presentation of an editing interface on a client computing platform associated with an administrator user. The files may store property values for the properties of the virtual content of the virtual space. The property value for a property of virtual content may be determined based on a selection of a file that stores the property value. The editing interface may be configured to receive selection of a file from a group of files that stores different property values for the same property in order to implement the property value(s) of the selected file. The editing interface may be configured to present visual cues to the administrator related to the selection of files that store different property values for the properties of the virtual content.

22 Claims, 5 Drawing Sheets

(56) References Cited

U.S. PATENT DOCUMENTS

| | | | | |
|---|---|---|---|---|
| 6,026,376 | A * | 2/2000 | Kenney | G06Q 30/06 705/26.61 |
| 6,088,698 | A * | 7/2000 | Lipkin | G06F 17/30398 |
| 6,263,339 | B1 * | 7/2001 | Hirsch | G06F 17/30607 |
| 6,282,547 | B1 * | 8/2001 | Hirsch | G06F 17/30572 715/207 |
| 6,466,239 | B2 * | 10/2002 | Ishikawa | G06T 15/10 715/850 |
| 6,744,436 | B1 * | 6/2004 | Chirieleison, Jr. | G06Q 10/087 345/419 |
| 6,757,893 | B1 * | 6/2004 | Haikin | G06F 8/71 717/170 |
| 6,915,301 | B2 * | 7/2005 | Hirsch | G06F 17/30607 707/915 |
| 7,029,121 | B2 * | 4/2006 | Edwards | G06F 3/013 351/246 |
| 7,581,172 | B2 * | 8/2009 | Ozzie | G06F 17/2205 709/203 |
| 7,680,694 | B2 * | 3/2010 | Glazer | G06Q 30/0253 705/26.43 |
| 7,752,205 | B2 * | 7/2010 | McVeigh | G06F 21/6236 707/736 |
| 7,839,419 | B2 * | 11/2010 | Hanggie | G06F 3/0481 345/619 |
| 7,840,614 | B2 * | 11/2010 | Owen | G06F 17/30873 707/821 |
| 7,953,734 | B2 * | 5/2011 | McVeigh | G06F 17/30893 707/736 |
| 8,059,137 | B2 * | 11/2011 | Hanggie | G06F 3/0481 345/619 |
| 8,099,779 | B2 * | 1/2012 | Owen | G06F 17/30566 726/17 |
| 8,316,025 | B2 * | 11/2012 | McVeigh | G06F 17/30893 707/736 |
| 8,348,767 | B2 * | 1/2013 | Mahajan | A63F 13/60 463/42 |
| 8,358,302 | B2 * | 1/2013 | Castelli | G06F 3/04815 345/419 |
| 8,605,084 | B2 * | 12/2013 | Castelli | G06F 3/04815 345/419 |
| 9,753,940 | B2 * | 9/2017 | Han | H04L 67/38 |
| 9,886,682 | B2 * | 2/2018 | Marin | G06Q 10/0633 |
| 2002/0040332 | A1 * | 4/2002 | Maari | G06Q 10/087 705/26.5 |
| 2002/0180771 | A1 * | 12/2002 | Lin | A63F 13/12 715/700 |
| 2003/0058238 | A1 * | 3/2003 | Doak | G06T 19/00 345/419 |
| 2005/0091291 | A1 * | 4/2005 | Kaler | G06F 8/71 |
| 2005/0261980 | A1 * | 11/2005 | Hadi | G06O 30/06 705/26.43 |
| 2006/0011716 | A1 * | 1/2006 | Perkowski | G06Q 30/02 235/375 |
| 2007/0118437 | A1 * | 5/2007 | Perrault | G06Q 30/0641 705/27.1 |
| 2008/0065468 | A1 * | 3/2008 | Berg | G06Q 30/02 705/7.32 |
| 2009/0215536 | A1 * | 8/2009 | Yee | A63F 13/10 463/42 |
| 2009/0287707 | A1 * | 11/2009 | Lyle | A63F 13/10 |
| 2010/0093438 | A1 * | 4/2010 | Baszucki | A63F 13/12 463/42 |
| 2010/0205035 | A1 * | 8/2010 | Baszucki | G06Q 20/102 705/14.12 |
| 2010/0205043 | A1 * | 8/2010 | Edwards | G06Q 30/0201 705/7.29 |
| 2010/0285880 | A1 * | 11/2010 | Crocker | H04L 67/38 463/36 |
| 2011/0055733 | A1 * | 3/2011 | Hamilton, II | A63F 13/79 715/757 |
| 2011/0137862 | A1 * | 6/2011 | Kamimura | G06F 17/30581 707/624 |
| 2011/0231781 | A1 * | 9/2011 | Betzler | G06F 12/0875 715/757 |
| 2011/0254670 | A1 * | 10/2011 | Han | G06T 19/006 340/407.1 |
| 2012/0017161 | A1 * | 1/2012 | Hirshberg | G06F 3/04886 715/763 |
| 2012/0191737 | A1 * | 7/2012 | Han | A63F 13/10 707/756 |
| 2013/0066717 | A1 * | 3/2013 | Marovets | G06Q 30/02 705/14.49 |
| 2013/0069804 | A1 * | 3/2013 | Han | G06F 3/011 341/20 |
| 2013/0103755 | A1 * | 4/2013 | Park | H04L 67/42 709/203 |
| 2013/0204852 | A1 * | 8/2013 | Han | H04L 67/38 707/693 |
| 2015/0091942 | A1 * | 4/2015 | Ko | G06F 17/3087 345/633 |

OTHER PUBLICATIONS

Hoyer, Helmut, et al. "A multiuser virtual-reality environment for a tele-operated laboratory." IEEE Transactions on education 47.1 (2004): 121-126. (Year: 2004).*

Kiss, Szilárd. "3D character modeling in virtual reality." Information Visualisation, 2002. Proceedings. Sixth International Conference on. IEEE, 2002. (Year: 2002).*

* cited by examiner

| UID | Color |
|---|---|
| Shirt_1 | Blue |

FIG. 3 (50)

| UID | Color |
|---|---|
| Shirt_1 | Green |

FIG. 4 (54)

| UID | Name | Color | Price | Logo |
|---|---|---|---|---|
| Shirt_1 | T-shirt | White | $12 | Heavy Metal |
| Shirt_2 | Sweater | Plaid | $18 | Country |

FIG. 5 (64)

| UID | Name | Color | Price |
|---|---|---|---|
| Shirt_3 | Cardigan | Charcoal | $32 |

FIG. 6 (68)

| UID | Price | Logo |
|---|---|---|
| Shirt_3 | $38 | Orchestra |

FIG. 7 (76)

| UID | Price | Logo |
|---|---|---|
| Shirt_3 | $29 | Choir |

FIG. 8 (79)

| UID | Name | Color | Price | Logo |
|---|---|---|---|---|
| Shirt_1 | T-shirt | White | $12 | Heavy Metal |
| Shirt_2 | Sweater | Plaid | $18 | Country |
| Shirt_3 | Cardigan | Charcoal | $32 | |

SYSTEMS AND METHODS FOR EDITING VIRTUAL CONTENT OF A VIRTUAL SPACE

FIELD OF THE DISCLOSURE

This disclosure relates to virtual spaces.

BACKGROUND

Virtual spaces may be defined by one or more electronic files that store data and/or information related to the execution of the virtual space. Files may store information about virtual content included in the virtual space. Virtual content may include one or more virtual objects, an aspect of the virtual space (e.g., topography, topographical elements, upgrades, display skins, etc.), and/or other considerations of virtual content. Virtual content may be associated with one or more properties that define the virtual content. Properties of the virtual content may be defined by property values stored by the files.

The execution of a virtual space may be associated with hundreds, if not thousands of such files. The execution of the virtual space may require an assembly of these files, referred to as the "build", wherein many files are compiled together to define one or more sets of content to ultimately define the virtual space as a whole. Administrators and/or designers wishing to make changes to the virtual content must carefully keep track of information stored at these many different file locations. For example, files may be organized based on naming conventions and/or other organization techniques which an administrator or designer must remember when making changes to the information stored by the files.

SUMMARY

Accordingly, one or more aspects of the disclosure relates to system for editing virtual content of a virtual space. The system may include one or more physical processors configured to effectuate presentation of an editing interface that provides a cohesive and organized editing tool for administrators of the virtual space. The editing interface may display information stored in many individual files that are merged into a collection shown in a single editor window. Therefore, even when a signal file in a collection of files only includes a small subset of information, the user may be able to view the information for the entire collection of files. The editing interface may be configured with one or more visual cues that aid the user to keep track of when information is edited and/or changed.

In some implementations, the system may comprise one or more physical processors configured to execute one or more computer components for implementing an instance of the editing interface. The editing interface may facilitate user access to files stored in electronic storage of the system for editing the information stored therein. The computer program components may include one or more of a space component, an editing interface component, and/or other components.

The electronic storage may comprise electronic storage media configured to store electronic files that define virtual objects implemented in the virtual space. An individual file may be associated with one or more properties of one or more virtual objects. An individual file may store a property value for each of the one or more properties associated with the file. For example, a first object may be defined, at least in part, by a first file or a second file. The first file may be associated with a first property of the first object. The first file may store a first value for the first property. The second file may be associated with the first property of the first object. The second file may store a second value for the first property.

The space component may be configured to execute an instance of the virtual space. The virtual space may be implemented to include one or more virtual objects. For example, the one or more virtual objects implemented in the virtual space may include the first object. The property values for the properties of the one or more virtual objects that are implemented in the virtual space may be determined based on a selection of the files that store property values. For example, in the execution of the virtual space, the property value for the first property of the first object may be determined based on a user selection of the first file, the second file, and/or other files.

The editing interface component may be configured to effectuate presentation of an editing interface for selecting files. The editing interface may include one or more layers that correspond to file groups. The file groups may include files that store different property values for one or more properties that are associated commonly between the files. A given layer may be selectable by a user to make selections of the different files included in the file group that corresponds to the layer. For example, the editing interface may be configured to facilitate selecting files for the first virtual object. The editing interface may include a first layer corresponding to a first file group. The first file group may include the first file and the second file. The first layer may be selectable by the user to select the first file or the second file.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 9 illustrates an implementation of a user interface for editing virtual content of virtual space.

FIG. 10 illustrates another implementation of the user interface for editing virtual content of virtual space.

FIG. 11 illustrates another implementation of the user interface for editing virtual content of virtual space.

FIG. 12 illustrates still another implementation of the user interface for editing virtual content of virtual space.

DETAILED DESCRIPTION

Figure 1:
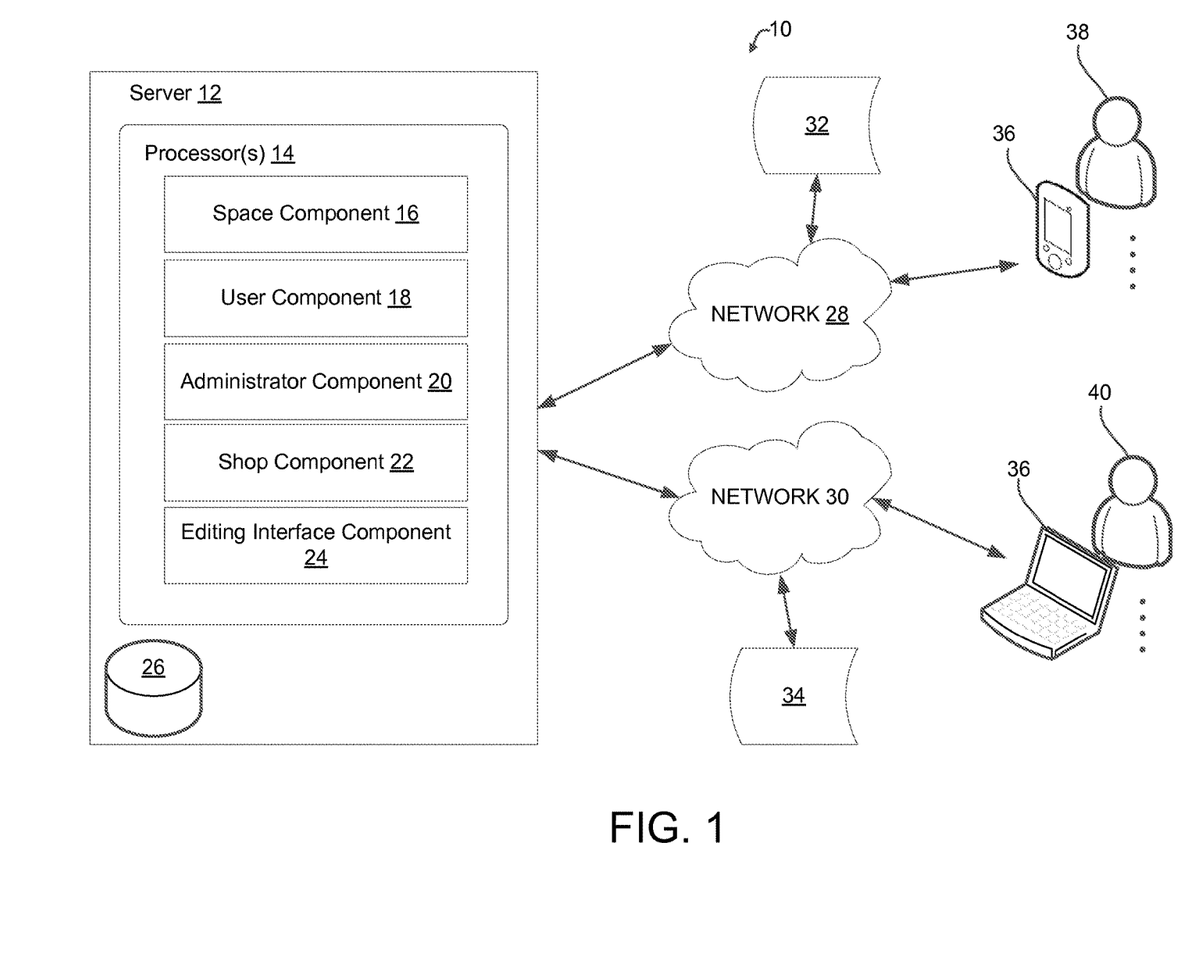
FIG. 1 illustrates a system for editing virtual content of a virtual space.

FIG. 1 illustrates a system 10 for editing virtual content of a virtual space. A virtual space may include an online game taking place in the virtual space. The virtual space may be hosted over a network 28, such as the Internet, to facilitate participation by users 38 (e.g., players of the online game taking place in the virtual space) with the virtual space by executing an instance of the virtual space. Information may be transmitted over the Internet to client computing platforms 36 associated with the users 38 to facilitate presentation of the virtual space to the users 38 on the client computing platforms 36. A host server 12 may include processor(s) 14. The server 12 may include electronic storage 26.

The system 10 may include one or more administrator users 40 that are different from the users 38. An administrator user 40 may be an administrator of the system 10, the server 12, and/or the virtual space. An administrator user 40 may be a user that is given (authenticated) access to files that store information that defines virtual content of the virtual space and/or is otherwise related to the execution of the virtual space. For example, electronic files stored in electronic storage 26 may define, for example, property values of properties of the virtual content of the virtual space. The files may be of a computer-readable format suitable to facilitate execution of the virtual space by the server 12 (e.g., processors 14) to include the virtual content defined by the files. For example, the files may be RDF, XML, JSON, and/or other considerations of file formats suitable for the intended purposes described herein.

Virtual content may include one or more virtual objects, an aspect of the virtual space (e.g., topography, topographical elements, upgrades, display skins, etc.), and/or other considerations of virtual content. A virtual object may include a virtual item and/or a virtual good, a character, group of characters, and/or other considerations of virtual objects. Virtual items and/or goods may include one or more of a virtual weapon, a tool, a food, a currency, a reward, a bonus, health, a potion, an enhancement, a mount, a power-up, a speed-up, virtual clothing (e.g., shirt, hat, pants, etc.), a vehicle, an anatomical feature of a character or game entity, a troop or troop type, a pet, a virtual resource, and/or other considerations of virtual items and/or goods. Virtual items and/or virtual goods may be usable within the virtual space and/or an online game that takes place in the virtual space.

Virtual content may be associated with one or more properties. Properties of virtual content may include, for example, a type (e.g., a character type vs. a weapon type), a name, a price, a visual aspect of the content (e.g., a color, a size, a shape, a design, a logo, and/or other considerations), and/or other considerations of properties of virtual content of the virtual space. Properties of the virtual content may be defined by property values stored by the files. A given file may store a property value for one or more properties of the virtual content that are associated with the file. For example, a file may store a property value for the color property of a virtual item that defines the color of the item as "green", "red", "blue", and/or other consideration.

Administrator users 40 may access files to edit and/or otherwise access property values stored by the files. Editing the property values of the properties of virtual content may create different variations of the virtual content in the virtual space. In other words, variations of a particular piece of virtual content, such as a virtual object, may correspond to different implementations of the virtual object where a different property value for the same property is employed. Herein, the terms "edit" and/or "editing" may refer to one or more of creating, adding, and/or removing some of the information stored by the file in the electronic storage 26, such as the property values for properties of the virtual content. Information included in the files and/or other electronic media stored in electronic storage 26 may be transmitted over a network 30 to client computing platforms 36 associated with the administrator users 40 to facilitate editing of information by the administrator users 40 on the client computing platforms 36. Editing of information stored by the files and/or other electronic media may be facilitated by the presentation of an editing interface, such as the interface 81 shown in FIG. 9-16, described in more detail herein.

In some implementations, the network 30 may be a local area network that connects the client computing platforms 36 associated with the administrator users 40 with the electronic storage 26 (e.g., or server 12), e.g., via wifi. In some implementations, network 28 and network 30 may be the same network (e.g., the Internet). In some implementations, the client computing platforms 36 associated with administrator users 40 may be in direct (e.g., hardwired) communication with the electronic storage 26 (and/or server 12).

The client computing platforms 36 can include, for example, a cellular telephone, a smartphone, a laptop, a tablet computer, a desktop computer, a television set-top box, smart TV, a gaming console, and/or other device suitable for the intended purposes as described herein and/or other considerations In FIG. 1, providing the virtual space may include hosting the virtual space over the network 28, such as the Internet. The host server 12 may include one or more processors 14 configured to execute one or more computer components for implementing an instance of a virtual space and/or an online game taking place within the virtual space and to facilitate the participation of one or more users 38 in the virtual space and/or the online game.

Providing the editing interface may include hosting the editing interface over network 30. The host server 12 may include one or more processors 14 configured to execute one or more computer components for implementing an instance of the editing interface to facilitate access to files stored in electronic storage 26 by the administrator users 40 for editing information stored therein.

The computer program components may include one or more of a space component 16, a user component 18, an administrator component 20, a shop component 22, an editing interface component 24, and/or other components.

The space component 16 may be configured to implement an instance of the virtual space. The virtual space may be implemented to include one or more virtual objects and/or other virtual content. The virtual content may be defined by properties having property values. Property values for the properties of the one or more virtual objects that are implemented in the virtual space may be determined based on a selection of the files that store the property values. The instance of the virtual space may be executed by the computer components to determine state of the virtual space. The state may then be communicated (e.g., via streaming visual data, via object/position data, and/or other state information) from server 12 to client computing platforms 36 for presentation to users 38. The state determined and transmitted to a given client computing platform 36 may correspond to a view for a user character (or other game entity) being controlled by a user 38 via input devices (e.g., a controller) at the given client computing platform 36. The state determined and presented to a given client computing platform 36 may correspond to a location in the virtual space (e.g., location in the game). The view described by the state for the given client computing platform 36 may correspond, for example, to the location from which the view is taken, the location the view depicts, and/or other locations, a zoom ratio, a dimensionality of objects, a point-of-view, and/or view parameters of the view. One or more of the view parameters may be selectable by the users 38.

An instance of the virtual space may comprise a simulated space that is accessible by users 38 via clients (e.g., client computing platforms 36) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the virtual space is determined by space component 16 is not intended to be limiting. The space component 16 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space component 16, users 38 may control game entities, simulated physical phenomena (e.g., wind, rain, earthquakes, and/or other phenomena), and/or other elements within the virtual space to interact with the virtual space and/or each other. The game entities may include virtual characters such as avatars. As used herein, the term game entity may refer to an object (or group of objects) present in the virtual space that represents an individual user. The game entity may be controlled by the user 38 with which it is associated. The user controlled element(s) may move through and interact with the virtual space (e.g., non-user characters in the virtual space, other objects in the virtual space). The user controlled elements controlled by and/or associated with a given user 38 may be created and/or customized by the given user. The user may have an "inventory" of virtual items and/or currency that the user can use (e.g., by manipulation of a user character or other user controlled element, and/or other items) within the virtual space.

The users 38 may participate in the instance of the virtual space by controlling one or more of the available user controlled game entities in the virtual space. Control may be exercised through control inputs and/or commands input by the users through client computing platforms 36. The users 38 may interact with each other through communications exchanged within the virtual space. Such communications may include one or more of textual chat, instant messages, private messages, voice communications, and/or other communications. Communications may be received and entered by the users 38 via their respective client computing platforms 36. Communications may be routed to and from the appropriate users through server 12 (e.g., through space component 16) and/or through communications which are external to the system 10 (e.g., text messaging services associated with the client computing platforms 36).

The instance of the virtual space and/or the online game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, changes to the virtual items available for use in the online game, and/or other changes.

In FIG. 1, the user component 18 may be configured to access and/or manage one or more user profiles and/or user information associated with users 38 of the system 10. The one or more user profiles and/or user information may include information stored by server 12, one or more of the client computing platforms 36, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual (or real) currency account information (e.g., related to currency held in credit for a user), virtual inventory information (e.g., virtual inventories associated with the users that include one or more virtual items available for the users in the virtual space), relationship information (e.g., information related to relationships between users in the virtual space), virtual space usage information (e.g., a log-in history indicating the frequency and/or amount of times the user logs-in to the user accounts), demographic information associated with users, interaction history among users in the virtual space, information stated by users, browsing history of users, a client computing platform identification associated with a user, a phone number associated with a user, and/or other information related to users.

The administrator component 20 may be configured to access and/or manage one or more user profiles and/or user information associated with the administrator users 40 of the system 10. The one or more user profiles and/or user information of the administrator users 40 may include information stored by server 12, one or more of the client computing platforms 36, and/or other storage locations. The user profiles of administrator users 40 may include, for example, information identifying the administrator users (e.g., a username or handle, a number, an identifier, and/or other identifying information), security login information (e.g., a login code or password for challenge-response authentication), editing history information (e.g., information related to a given administrator user's access to files where changes were made), and/or other information related to administrator users 40.

In some implementations, the files stored in the electronic storage may be a protected resource of the server 12. The administrator component 20 may be configured to authenticate users as administrator users to allow access to the files stored in electronic storage 26. Challenge-response authentication may be employed to authenticate users for access to the protected resource. In response to authentication, the administrator users may be presented an editing interface used for accessing and/or otherwise editing information stored in the files (e.g., facilitated by editing interface component 24).

Electronic storage 26 may be configured to store electronic files that define virtual objects and/or other virtual content implemented in the virtual space. An individual file may be associated with one or more properties of one or more virtual objects and/or other virtual content. An individual file may store a single property value for each of the one or more properties associated with the file for each of the one or more virtual objects the file stores values for. In an execution of an instance of the virtual space including one or more virtual objects, the property values for the properties of the one or more virtual objects that are implemented in the virtual space may be determined based on a selection (by an administrator user 40) of the files that stores property values. For example, when a file for a given virtual object is selected by an administrator user 40, the property value(s) stored by the file will define the property values of the properties of the virtual object in the executed virtual space.

The editing interface described in more detail herein, may allow an administrator user 40 to easily change the property value for one or more properties of a virtual object. This type of "changing" of property values may allow the administrator user 40 to "test" different variations of the virtual objects having different property values for one or more properties of the virtual object in the executed virtual space. For example, testing of different property values of a property of a virtual object may allow an administrator user 40 to determine a variation of the virtual object which is best suited for all users, a specific user, and/or a group of users.

In some implementations, testing of this sort may be referred to as "A-B" testing (e.g., testing a user's response to variation 'A' of a virtual object compared to variation 'B' of the virtual object). Testing may be performed on a system wide basis (e.g., for all users 38 of system 10), and/or on a specific user and/or user group basis.

In some implementations, files may be grouped into file groups. The file groups may include files that store different property values for one or more properties that are associated commonly between the files. As such, the property values for the commonly associated properties stored by the files can be used for this type of A-B testing. The follow descriptions of examples of files used to store property values of properties of virtual objects are provided for illustrative purposes only and are not intended to be limiting.

Figure 2:
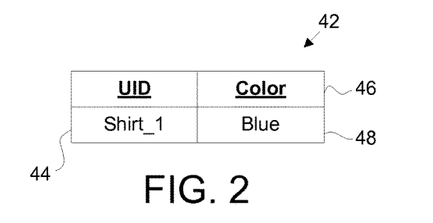
FIG. 2 illustrates a visual representation of a file storing a property value for a property of a virtual object.

FIG. 2-FIG. 7 depict visual representations of examples of files stored by electronic storage 26 (FIG. 1) that store a property value for each of one or more properties of one or more virtual objects associated with the file. In FIG. 2, a first object may be defined, at least in part, by a first file 42 (e.g., when the first file 42 is selected by an administrator user). The first object may be identified by a unique identifier (e.g., UID). For illustrative purposes, the first object may be a piece of virtual clothing, such as a shirt. The first object may have a first UID 44 that is "shirt_1". The first file 42 may be associated with a first property 46 of the first object. The first property 46 may be, for example, color. The first file 42 may store a first value 48 for the first property 46. The first value 48 may be, for example, that the first object is the color "blue".

Figure 3:
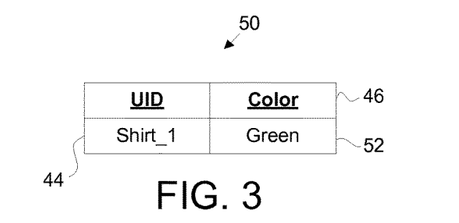
FIG. 3 illustrates a visual representation of a file storing a property value for a property of a virtual object.

FIG. 3 illustrates a visual representation of a second file 50 that may be used to define, at least in part the first object (e.g., when, for example, the second file 50 is selected by an administrator user). The second file 50 may identify the first object by the first UID 44. The second file 50 may also be associated with the first property 46 of the first object. The second file may store a second value 52 for the first property 46 of the first object. The second value 52 may be different than the first value 48 stored in the first file 42. The second value 52 may be, for example, that the first object is the color "green".

Figure 4:
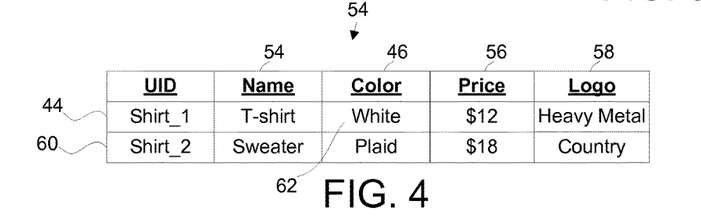
FIG. 4 illustrates a visual representation of a file storing property values for multiple properties of multiple virtual objects.

FIG. 4 depicts a visual representation of a third file 54 storing a property value for properties of more than one virtual object. The third file 54 may store property values for the first object and a second object. The first object may be identified by the first UID 44. The second object may be identified by a second UID 60 (e.g., "shirt_2"). The properties associated with the third file 54 may include the first property 46 (e.g., a color), a second property 54 (e.g., a name), a third property 56 (e.g., a price), and a fourth property 58 (e.g., a logo). The third file 54 may store property values for each of the properties associated with the file, and for each of the virtual objects identified in the third file 54. For example, the third file 54 may store a third value 62 for the first property 46 of the first object (and/or other property values for other properties of the first object and second object). The third value 62 may be different than the first value 48 and second value 52 stored in the first file 42 and second file 50, respectively. For example the third value 62 may define the color of the first object as "white".

In some implementations, the third file 54 may represent a file used to store initial or "baseline" values for properties of the first object and the second object. In other words, the property values stored in the third file 54 (or other "baseline" type file) may be what are initially selected to define property values for one or more properties of the first object and the second object in an otherwise unedited execution of the virtual space.

In some implementations, FIG. 2 and FIG. 3 may represent files included in a file group that includes files that store different property values for one or more properties that are associated commonly between the files. The first file 42 and the second file 50 included in a file group may be used for A-B testing different property values for the property that is associated commonly between the files, e.g., the first property 46. For example, if the first object is to be sold in a virtual shop of the virtual space, an administrator may want to see if the users of the virtual space prefer the first object as blue as opposed white, green as opposed to white, and/or green as opposed to blue (and/or other test colors). The system 10 described herein may facilitate a streamline and efficient manner in which an administrator user 40 can easily switch the property values for one or more properties of one or more virtual objects for such testing, for example via the editing interface described in more detail herein. For example, when a property value of a property is changed from a baseline and/or an other previous selection of a value, the newly selected property value may be considered as to "override" the previous selection of the property value. An "override" may be visually reflected by a visual indication on the editing interface. This together with other aspects of the disclosure may provide an editing interface that provides administrators an efficient and organized A-B testing environment.

Figures 5, 6, 7:
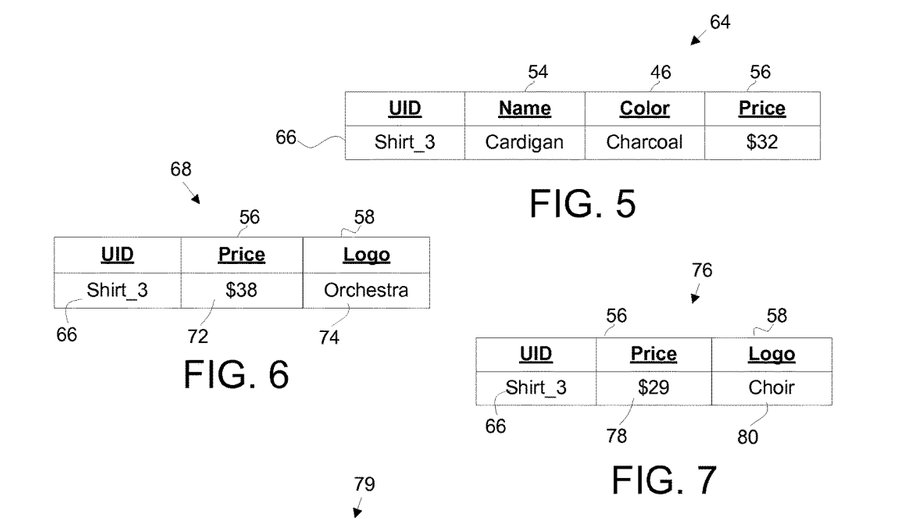
FIG. 5 illustrates a visual representation of a file storing property values for multiple properties of a virtual object.
FIG. 6 illustrates a visual representation of a file storing property values for multiple properties of a virtual object.
FIG. 7 illustrates a visual representation of a file storing property values for multiple properties of a virtual object.

FIG. 5 depicts a visual representation of a fourth file 64 that stores property values for each of the first property 46, second property 54, and third property 56 of a third object identified by a third UID 66, e.g., "shirt_3". The fourth file 64 may represent a file that stores the "baseline" values for the first property 46, second property 54, and third property 56 of the third virtual object.

FIG. 6 depicts a visual representation of a fifth file 68 that stores a fourth property value 72 (e.g., $38) for the third property 56 (e.g., a price) of the third object. The fifth file 68 may store a fifth property value 74 (e.g., "Orchestra") for the fourth property 58 (e.g., a logo) of the third object.

FIG. 7 depicts a visual representation of a sixth file 76 that stores a sixth property value 78 (e.g., $29) for the third property 56 (e.g., a price) of the third object. The sixth file 76 may store a seventh property value 80 (e.g., "choir") for the fourth property 58 (e.g., a logo) of the third object.

In some implementations, the files of FIG. 6 and FIG. 7 may be files included in a file group. The file group may include files that store different property values (72, 74, 78, 80) for one or more properties (56, 58) that are associated commonly between the files. The fifth file 68 and the sixth file 76 may be are used for A-B testing the property value for the commonly associated one or more properties, in this case, the third property 56 and the fourth property 58. For example, the fifth file 68 and the sixth file 76 may be used for A-B testing the property value for the third property 56 and the fourth property 58 compared to the baseline values of the third property 56 and the fourth property 58 (e.g., the values stored in the fourth file 64 of FIG. 5).

Figure 8:
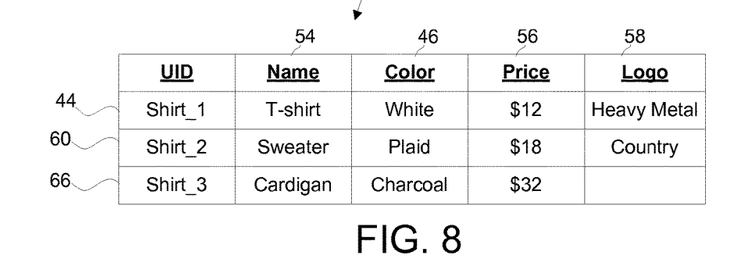
FIG. 8 illustrates a visual representation of layers of files, used to define the property value for one or more properties of one or more virtual objects implemented in the virtual space.

FIG. 8 depicts a visual representation of a first collection of files 79 (e.g., files layered atop on another) that define property values for one or more properties of one or more virtual objects that may be implemented simultaneously in the virtual space. For example, the first collection of files 79 may include the third file 54 (FIG. 4) and the fourth file 64 (FIG. 5) that may represent the "baseline" selection of property values for the first object, second object, and third object, wherein the first object, second object, and third object comprise at least some of the virtual content of the virtual space. As will be brought out in the following description of the editing interface 81 below, the system 10 herein may facilitate A-B testing property values of one or more properties of the first object, second object, and/or third object (and/or more or less virtual objects and/or other content).

Returning to FIG. 1, the shop component 22 may be configured to present offers to sell instances of virtual objects to users in a virtual shop. The virtual shop may be a simulated environment within the virtual space which is accessible by users and presents the views of the virtual shop to the users. Users may access the virtual shop through one of a variety of ways. Users may access the virtual shop through the manipulation of one or more entities associated with the user within the virtual space using control inputs and/or commands input by the users through client computing platforms 36, and/or other way of access.

Manipulation of an entity, such as a character, may include moving the one or more entities through the virtual space using control inputs and/or commands input by the users through client computing platforms 36, to move the one or more entities to the simulated environment designating the location of the virtual shop within the virtual space.

Users 38 may use control inputs and/or commands not associated with the one or more entities to access the virtual shop. Control inputs and/or commands may automatically present the instance of the virtual shop on the clients computing platforms 36 (e.g., user selects a virtual shop button to automatically be taken to the virtual shop).

The instance of the virtual shop may be presented to users through a shop interface. The shop interface may be configured to present the offers to sell virtual objects to users 38. The shop interface may be configured to receive entry and/or selection of individual offers by the users to effectuate acceptance and/or purchase of the offers at a virtual (or real) currency purchase price.

The simulated environment of the virtual shop may have topography. The virtual shop may express ongoing real-time interaction by one or more users (e.g., may have limited stock of virtual items for sale which can be purchased by one or more users within the virtual space which can be depleted), and/or include one or more objects (e.g., one or more virtual items, a virtual teller, and/or other objects) positioned within the topography that may be capable of locomotion within the topography. The virtual shop may display the virtual objects, and/or the one or more sets of virtual content available for purchase by the users. Users may view the virtual objects (e.g., individual virtual items and/or sets of virtual items) available for purchase. The display of the virtual objects may be in accordance with a current selection of one or more files that store property values of the properties that define the virtual objects. A change in the property value of a property of a virtual object based on an administrator selection of a file that stores the property value may be reflected in the view and/or description of the virtual objects in the virtual shop. Users may purchase the virtual items using virtual (or real) currency. Transactions may take place with the virtual teller, through various other actions of the user within the instance of the virtual shop, and/or other offer/transaction mechanisms.

In FIG. 1, the editing interface component 24 may be configured to effectuate presentation, on client computing platforms 36 associated with the administrator users 40, of an editing interface for selecting files stored by electronic storage 26.

FIG. 9 illustrates an implementation of the editing interface 81 used for selecting files for editing virtual content of a virtual space. Editing interface 81 may be used, for example, to select files in order to change property values of properties of virtual objects included in the virtual space for A-B testing, and/or for other purposes. For illustrative purposes, the editing interface 81 shown in FIG. 9-16 depicts one or more editing procedures for changing the property values related to the first object, second object, and third object. However, it is to be understood that the descriptions provided herein may be carried out for more or less object, and/or for other types of virtual content (e.g., topographical elements of the topography of the virtual space).

In some implementations the editing interface 81 may be configure to present one or more of: an identification of the one or more virtual objects that are implemented in the virtual space and are the current subject of editing, the one or more of the properties of the one or more virtual objects, and each property value associated with each of the one or more properties according to selected files (e.g., the first collection of files 79 defining baseline values and/or other previously selected files). For example, in FIG. 9, the user interface 81 may be configured to present an identification of the first object (e.g., first UID 44) and/or other objects, the first property 46 and/or other properties, and the third value 62 for the first property 46. The third value 62 may be determined based on selection of the third file 54 that stores the third value 62, and by virtue of the third file 54 being included in the first collection of files 79 that define baseline values for the first object, second object, and third object which are the current subjects of editing.

The editing interface 81 may be configured to include one or more layers that correspond to file groups. The file groups may include files that store different property values for one or more properties that are associated commonly between the files as described previously. A given layer may be selectable by an administrator user to make selections of the different files included in the file group that corresponds to the layer.

In some implementations, the editing interface 81 may be configured to include one or more selection interface elements 82a-d that correspond to the different layers. The interface elements 82a-d may be configured to receive user entry and/or selection of the layer such that a selected layer is made "active". The current depiction of the editing interface 81 includes four layers, e.g., Layer 1, Layer 2, Layer 3, and Layer 4, having interface elements 82a-d associated with each to facilitate selection thereof. However, it is to be understood that other implementations may include an editing interface having more or less layers than currently depicted.

In some implementations, the editing interface 81 may be configured to include one or more toggle interface elements 84a-d. Interface elements 84a-d may be configured to receive user entry and/or selection for toggling through the files included in the file group that corresponds to the selected layer for making the desired selection.

In the current implementation, Layer 1 (herein "first layer") may correspond to a first file group including the first file 42 (FIG. 2), the second file 50 (FIG. 3) and/or other files. Layer 2 (herein "second layer") may correspond to a second file group including the third file 54 (FIG. 4) and/or other files. However, for illustrative purposes, the second layer will be considered as only including the third file 54. Layer 3 (herein "third layer") may correspond to a third file group including the fourth file 64 (FIG. 5) and/or other files. However, for illustrative purposes, the third layer will be considered as only including the fourth file 64. Layer 4 (herein "fourth layer") may correspond to a fourth file group including the fifth file 68 (FIG. 6), the sixth file 76 (FIG. 7), and/or other files.

In some implementations, the editing interface 81 may be configured to include one or more "pages" tabs 86. The tabs 86 may be user selectable to allow the user to change between different windows (e.g., pages) of the editing interface 81 that are related to different collections of files (e.g., related to other content), different users or groups of users, and/or other considerations.

In FIG. 9, the user interface may be configured such that the first layer is selectable by the user to select either the first file 42 (FIG. 2) or the second file 50 (FIG. 3) for changing the property value of the first property 46 of the first object (e.g., and override any previous selections of a property value, if applicable). The user may select the first layer via entry and/or selection of the selection interface element 82a associated with the first layer (e.g., shown in the figure as being visually associated with Layer 1 due their adjacency). In some implementations, the editing interface 81 may be configured such that the portion of the display that presents the property value (e.g., the third value 62) of the first property 46 of the first object is visually highlighted in response to user selection of the first layer showing that the layer is now "active" (e.g., and since that is the commonly associated property for the files included in the file group of the first layer).

As shown in the figure, the portion of the display that is showing the third value 62 may be visually highlighted insofar that the other property values for the other properties of the first object, second object, and third object are visually dimmed (e.g., darkened). However, visually highlighting the appropriate portion of the display may be accomplished by other techniques. The visual highlighting may aid an administrator user to keep track of the various layers and changes, which may occur during subsequent editing procedures, described below.

As shown in FIG. 10, the editing interface 81 may be configured to receive user selection of the first file for overriding the third value 62 with the first value 48. User selection may be facilitated through selection of the toggle interface element 84a associated with the first layer. In some implementations, when a selection of file is made that overrides a previous property value, a visual indicator may be displayed. For example, responsive to a selection of the first file to override the third value 62 with the first value 48, the portion of the editing interface 81 displaying the newly selected value may include a visual indicator. The visual indicator may include, for example, hatch lines as shown, with the new value (e.g., the first value 48) laid over the hatch lines. This may aid the administrator user to remember and/or otherwise track that a current selection of a file (e.g., the first file) has overridden a previously selected value (e.g., the third value 62). As such, FIG. 10 shows a visual representation of a second collection of files 83 that includes the third file 54 (FIG. 4) the fourth file 64 (FIG. 5), and the first file 42 (FIG. 2), wherein the property value for the first property 46 for the first object has been overridden by the value stored in the first file 42.

As shown in FIG. 11 the editing interface 81 may be configured to receive user selection of the second file 50 (FIG. 3) for overriding the third value 62 with the second value 52. User selection may be facilitated through an additional selection of the toggle interface element 84a associated with the first layer. Again, the visual indicator of the second value 52 laid over hatched lines may be presented based on a selection of the second file 50 (FIG. 3). The editing interface 81 may be configured such that the user can toggle through other files included in the first file group (if any). The editing interface 81 may be configured such that the user can toggle essentially "out" of the first file group (e.g., such that no files included in the first file group are selected), wherein the property value for the first property 46 of the first object may return to an original selection (e.g., the third value 62). As such, FIG. 11 shows a visual representation of a third collection of files 85 that includes the third file 54 (FIG. 4) the fourth file 64 (FIG. 5), and the second file 50 (FIG. 3), wherein the property value for the first property 46 for the first object has been overridden by the value stored in the second file 50.

FIG. 12 depicts the editing interface 81 showing user selection of the second layer. Again, the second layer may correspond to a second file group including the third file 54 (FIG. 4). The property values stored in the third file 54 may be visually highlighted (e.g., currently shown by all other elements being visually dimmed). In some implementations, by virtue of a selection of a file that overrides a property value of another file (e.g., the selection of the second file such that the value "green" overrides the value "white" that was stored by the third file 54), a different visual indicator may be presented when a layer is selected that corresponds to a file in which a value was overridden. As shown, the original value of "white" has been overridden by the value of "green" due to a selection of the second file (e.g., shown in FIG. 11), such that the portion of the display that includes the overridden value, is shown with the new value displayed underneath hatch lines. Other techniques to visually indicate this may be employed. For example, a visual indicator that indicates that a current selection of a file is overriding a value associated with a previous selection of a file (e.g., FIGS. 10 and 11 with the value laid over hatch lines) may be different than a visual indicator that indicates that a value stored in a current file has been overridden by a previous selection of a file storing a different value (e.g., FIG. 12 with the value under hatch lines).

In FIG. 12, due the second layer corresponding to the second file group that only includes the third file 54 (in accordance with the current illustrative example), the toggle interface element 84b associated with the second layer may be unusable and/or otherwise unselectable (e.g., since there are no other files included in the second file group to toggle through).

Figure 13:
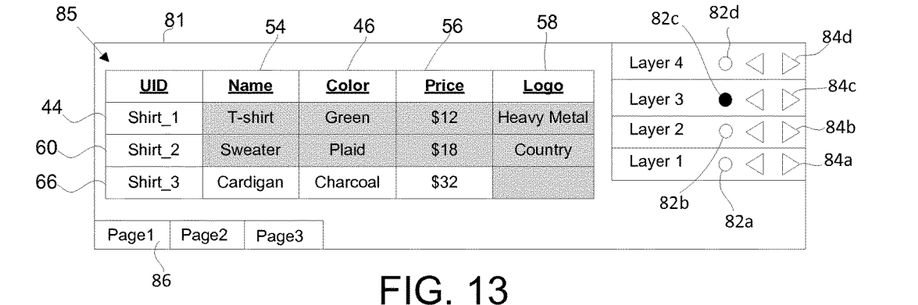
FIG. 13 illustrates yet another implementation of the user interface for editing virtual content of virtual space.

FIG. 13 shows an implementation of the editing interface 81 depicting user selection of the third layer. As shown the property values stored in the fourth file 64 included in the third file group are visually highlighted in response to a selection of the third layer. Due to the third layer corresponding to a third file group that only includes the fourth file 64 (FIG. 5), the toggle interface element 84c associated with the third layer may be unusable and/or otherwise unselectable. However the visual highlighting may still aid the administrator for organizational purposes.

Figure 14:
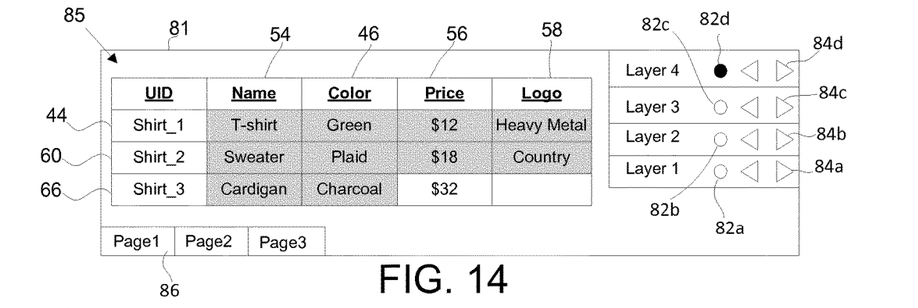
FIG. 14 illustrates yet another implementation of the user interface for editing virtual content of virtual space.
Figure 15:
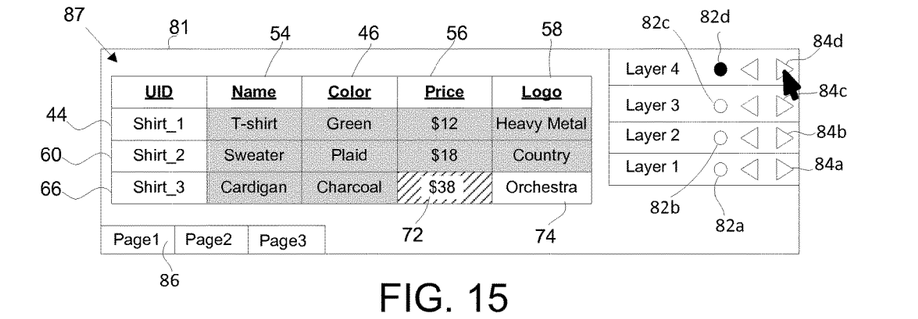
FIG. 15 illustrates another implementation of the user interface for editing virtual content of virtual space.
Figure 16:
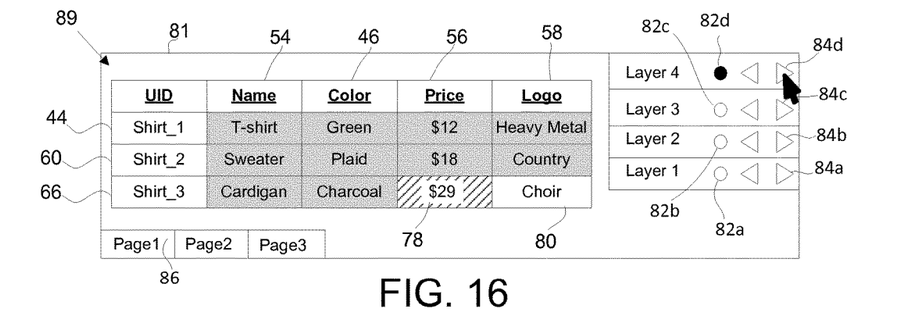
FIG. 16 illustrates still another implementation of the user interface for editing virtual content of virtual space.

FIG. 14-16 depict implementations of the editing interface 81 showing an example of A-B testing wherein files may be selected that are associated with multiple properties such that multiple property A-B testing may be performed.

In FIG. 14, the fourth layer may be selected. The fourth layer may correspond to the fourth file group including the fifth file 68 (FIG. 6) and the sixth file 76 (FIG. 7). The fifth file 68 and the sixth file 76 may be included in the fourth file group due to the commonality of properties associated with the files. For example, it can be easily determined that the fifth file 68 and the sixth file 76 are commonly associated by the third property 56 and the fourth property 58 of the third object. As such, the selection of the fourth layer may result in the property value of the third property 56 and the property value of the fourth property 58 of the third object being visually highlighted, as shown in the figure. Absent a selection of the fifth file 68 or the sixth file 76 (e.g., via toggle interface element 84d), the baseline property value for the third property 56 and fourth property 58 may be maintained as the current selection.

The editing interface 81 may be configured to receive user selection of the fifth file 68 (FIG. 15) or the sixth file 76 (FIG. 16). In FIG. 15, the selection of the fifth file 68 may be reflected by the property value of the third property 56 being overridden by the fourth value 72, and the property value of the fourth property 58 be selected as the fifth value 74 (e.g., since a baseline value for the fourth property 58 of the third object was not defined by the fourth file 64). A visual indicator of the fourth value 72 overriding a previous value may be provided. A visual indicator of the fifth value 74 being the first selection of a value for the fourth property 58 may or may not be provided. As such, FIG. 15 shows a visual representation of a fourth collection of files 87 that includes the third file 54 (FIG. 4), the fourth file 64 (FIG. 5), the second file 50 (FIG. 3) wherein the property value for the first property 46 for the first object has been overridden by the value stored in the second file 50, and the fifth file 68 (FIG. 6), wherein the property values for the third property 56 and the fourth property 58 of the third object have been overridden by the values stored in the fifth file 68.

In FIG. 16, the selection of the sixth file 76 may be reflected by the property value of the third property 56 being overridden by the sixth value 78, and the property value of the fourth property 58 be selected as the seventh value 80. A visual indicator of the sixth value 78 overriding a previous value may be provided. A visual indicator of the seventh value 80 being the first selection of a value for the fourth property 58 may or may not be provided. As such, FIG. 16 shows a visual representation of a fourth collection of files 87 that includes the third file 54 (FIG. 4), the fourth file 64 (FIG. 5), the second file 50 (FIG. 3) wherein the property value for the first property 46 for the first object has been overridden by the value stored in the second file 50, and the sixth file 76 (FIG. 7), wherein the property values for the third property 56 and the fourth property 58 of the third object have been overridden by the values stored in the sixth file 76.

Returning to FIG. 1, the server 12, client computing platforms 36, and/or external resources 32, 34 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 36, and/or external resources 32, 34 may be operatively linked via some other communication media.

The external resources 32, 34 may include sources of information, hosts and/or providers of virtual spaces outside of system 10, external entities participating with system 10, and/or other resources. In some implementations, some or all of the functionality attributed herein to external resources 32 and 34 may be provided by resources included in system 10.

The server 12 may include electronic storage 26, one or more processors 14, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 26 may comprise electronic storage media that electronically stores information. The electronic storage media of electronic storage 26 may include one or both of system storage that is provided integrally (i.e., substantially non-removable) with server 12 and/or removable storage that is removably connectable to server 12 via, for example, a port or a drive. A port may include a USB port, a firewire port, and/or other port. A drive may include a disk drive and/or other drive. Electronic storage 26 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 26 may include one or more virtual storage resources (e.g., cloud storage, a virtual private network, and/or other virtual storage resources). Electronic storage 26 may store files, software algorithms, information determined by processor 14, information received from server 12, information received from client computing platforms 36, and/or other information that enables server 12 to function as described herein.

Processor(s) 14 is configured to provide information processing capabilities in server 12. As such, processor 14 may include one or more of a digital processor, an analog processor, a digital circuit designed to process information, an analog circuit designed to process information, a state machine, and/or other mechanisms for electronically processing information. Although processor 14 is shown in FIG. 1 as a single entity, this is for illustrative purposes only. In some implementations, processor 14 may include one or more processing units. These processing units may be physically located within the same device, or processor 14 may represent processing functionality of a plurality of devices operating in coordination. The processor 14 may be configured to execute components 16, 18, 20, 22, 24. Processor 14 may be configured to execute components 16, 18, 20, 22, 24 by software; hardware; firmware; some combination of software, hardware, and/or firmware; and/or other mechanisms for configuring processing capabilities on processor 14.

It should be appreciated that although components 16, 18, 20, 22, 24 are illustrated in FIG. 1 as being co-located within a single processing unit, in implementations in which processor 14 includes multiple processing units, one or more of components 16, 18, 20, 22, 24 may be located remotely from the other components. The description of the functionality provided by the different components 16, 18, 20, 22, 24 described above is for illustrative purposes, and is not intended to be limiting, as any of components 16, 18, 20, 22, 24 may provide more or less functionality than is described. For example, one or more of components 16, 18, 20, 22, 24 may be eliminated, and some or all of its functionality may be provided by other ones of components 16, 18, 20, 22, 24 and/or other components. As another example, processor 14 may be configured to execute one or more additional components that may perform some or all of the functionality attributed below to one of components 16, 18, 20, 22, 24.

Figure 17:
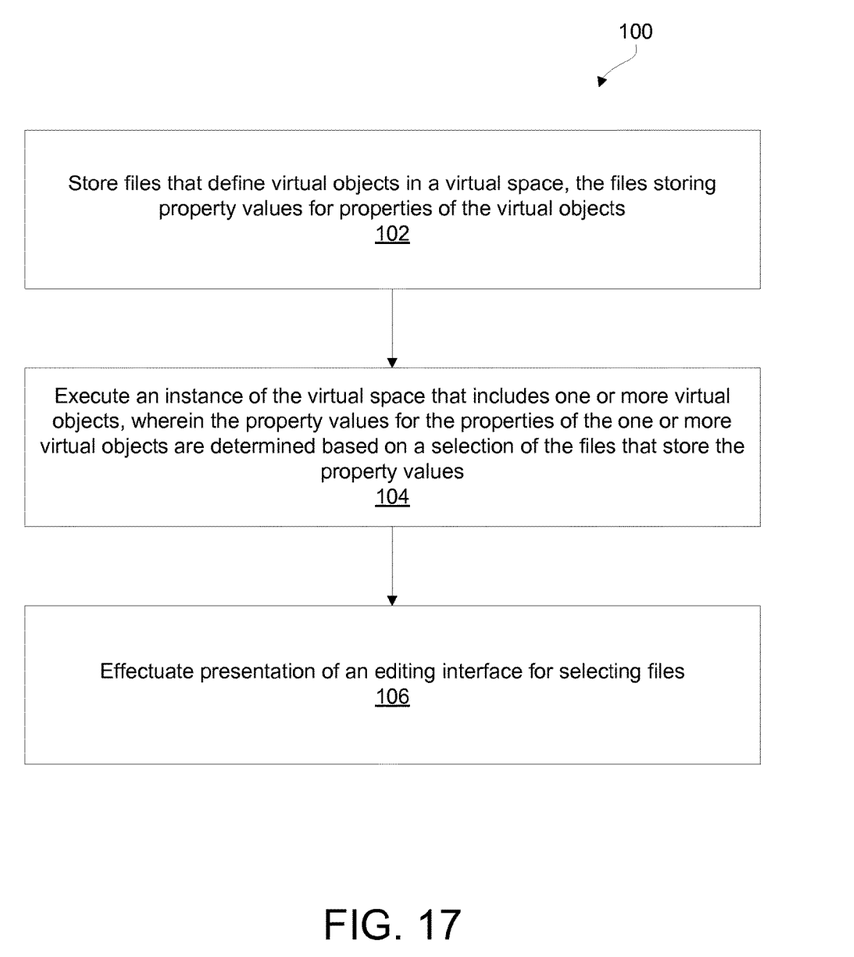
FIG. 17 illustrates an implementation of a method for editing virtual content of a virtual space.

FIG. 17 illustrates a method 100 of editing virtual content of a virtual space. The operations of method 100 presented below are intended to be illustrative. In some implementations, method 100 may be accomplished with one or more additional operations not described, and/or without one or more of the operations discussed. Additionally, the order in which the operations of method 100 are illustrated in FIG. 17 and described below are not intended to be limiting.

In some implementations, method 100 may be implemented in one or more processing devices (e.g., a digital processor, an analog processor, a digital circuit designed to process information, an analog circuit designed to process information, a state machine, and/or other mechanisms for electronically processing information), and/or one or more other components. The one or more processing devices may include one or more devices executing some or all of the operations of method 100 in response to instructions stored electronically on an electronic storage medium. The one or more processing devices may include one or more devices configured through hardware, firmware, and/or software to be specifically designed for execution of one or more of the operations of method 100.

Referring now to method 100 in FIG. 17, at an operation 102, files that define virtual objects implemented in the virtual space may be stored. The files may be stored in electronic storage. An individual file may be associated with one or more properties of one or more virtual objects. An individual file may store a property value for each of the one or more properties associated with the file. For example, a first object may be defined, at least in part, by a first file or a second file. The first file may be associated with a first property of the first object. The first file may store a first value for the first property. The second file may be associated with the first property of the first object. The second file may store a second value for the first property. In some implementations, operation 102 may be performed using electronic storage the same as or similar to electronic storage 26 (shown in FIG. 1 and described herein).

At an operation 104, an instance of the virtual space may be executed. The virtual space may be implemented to include one or more virtual objects. The property values for the properties of the one or more virtual objects that are implemented in the virtual space may be determined based on a selection of files that store the property values. The one or more virtual objects implemented in the virtual space may include the first object. In some implementations, operation 104 may be performed by a space component same or similar to space component 16 (shown in FIG. 1 and described herein).

At an operation 106, an editing interface may be presented on a client computing platform associated with an administrator of the virtual space. The editing interface may be configured to receive user selection of files that store a property value for each property associated with the file. In some implementations, operation 106 may be performed by an editing interface component the same or similar to editing interface component 24 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for editing virtual content of a virtual space, the system comprising:

non-transitory electronic storage configured to store electronic files, individual ones of the electronic files defining one or more instances of one or more virtual objects implemented in one or more instances of the virtual space, an individual file being associated with one or more virtual object properties, the individual file storing individual property values for individual ones of the one or more virtual object properties associated with the individual file, such that:

the electronic files include a first file and a second file concurrently stored in the non-transitory electronic storage, the first file being associated with a first property, the first file storing a first value for the first property, the second file being associated with the first property, the second file storing a second value for the first property;

a first instance of a first virtual object in a first instance of the virtual space is defined, at least in part, by the first file or the second file based on implementation of either the first file or the second file; and implementing the first file during execution of the first instance of the virtual space causes the first instance of the first virtual object to be perceived in a first manner in the first instance of the virtual space, and implementing the second file during the execution of the first instance of the virtual space causes the first instance of the first virtual object to be perceived in a second manner in the first instance of the virtual space, the second manner being different from the first manner; and one or more physical processors configured by machine-readable instructions to:

execute the first instance of the virtual space, wherein executing the first instance of the virtual space includes implementing either the first file or the second file, the first instance of the virtual space being implemented to facilitate participation by a player in the first instance of the virtual space via a computing platform associated with the player, wherein the property value for the first property of the first instance of the first virtual object in the executed first instance of the virtual space is determined based on the selection of either the first file or the second file;

effectuate presentation of an editing interface configured to facilitate selection of files by administrators of the virtual space, the editing interface including:

one or more layers that correspond to file groups, a given file group including a set of files that store different property values for one or more virtual object properties that are associated commonly between individual files in the set of files, wherein a given layer corresponding to the given file group is selectable by an administrator to facilitate making further selections of individual files within the set of files included in the given file group; and wherein the editing interface includes a first layer corresponding to a first file group, the first file group including the first file and the second file, wherein the first layer is selectable by the administrator to facilitate making a further selection of the first file or the second file to define the property value of the first property of the first instance of the first virtual object by either the first value or the second value; and track player behavior within the virtual space and associate changes in player behavior with changes in property values of virtual object properties, the associations guiding future selections of individual property values among multiple property values available for individual virtual object properties of one or more other virtual objects, the future selections being made for one or more other players of the virtual space to elicit one or more behaviors from the one or more other players in the virtual space, such that responsive to tracking the player's behavior and determining a first behavioral change when the property value of the first property of the first instance of the first virtual object is changed from the first value to the second value, the first behavioral change is associated with the change in the property value of the first property, the association guiding a first future selection of an individual property value from among a first set of property values for a second property of a second virtual object, the first future selection being made for a second player participating in a second instance of the virtual space to elicit one or more behaviors from the second player.

2. The system of claim 1, wherein the one or more physical processors are further configured by machine-readable instructions such that the editing interface is further configured to present one or more of:

an identification of one or more instances of one or more virtual objects that are implemented in a given instance of the virtual space;

one or more of the virtual object properties of the instances of the one or more virtual objects; or property values associated with individual ones of one or more virtual object properties according to selected files; and wherein the editing interface is further configured to present one or more of an identification of the first instance of the first virtual object in the first instance of the virtual space, the first property, or a third value for the first property for the first instance of the first virtual object, the third value being presented based on a selection of a third file that stores the third value for the first property.

3. The system of claim 2, wherein the one or more physical processors are further configured by machine-readable instructions such that the editing interface is further configured to receive selection by the administrator of the first file for overriding the third value with the first value to effectuate a change in the first property of the first instance of the first virtual object in the first instance of the virtual space.

4. The system of claim 3, wherein the one or more physical processors are configured by machine-readable instructions such that the editing interface is further configured such that the selection by the administrator of the first file is visually indicated on the editing interface.

5. The system of claim 2, wherein the one or more physical processors are further configured by machine-readable instructions such that the editing interface is further configured to receive selection by the administrator of the second file for overriding the third value with the second value to effectuate a change in the first property of the first instance of the first virtual object in the first instance of the virtual space.

6. The system of claim 2, wherein the one or more physical processors are further configured by machine-readable instructions such that the editing interface is further configured such that a portion of the editing interface that displays property values for virtual object properties that are commonly associated with files included in a file group are visually highlighted in response to a selection of a layer that corresponds to the file group.

7. A method of editing virtual content of a virtual space, the method being implemented in a computer system including one or more physical processors and non-transitory electronic storage storing machine-readable instructions, the method comprising:

storing electronic files that define one or more instances of one or more virtual objects implemented in one or more instances of the virtual space, an individual file being associated with one or more virtual object properties, the individual file storing individual property values for individual ones of the one or more virtual object properties associated with the individual file, such that; the electronic files include a first file and a second file which are concurrently stored, the first file being associated with a first property, the first file storing a first value for the first property, the second file being associated with the first property, the second file storing a second value for the first property;

a first instance of a first virtual object in a first instance of the virtual space is defined, at least in part, by the first file or the second file based on implementation of either the first file or the second file; and implementing the first file during execution of the first instance of the virtual space causes the first instance of the first virtual object to be perceived in a first manner in the first instance of the virtual space, and implementing the second file during the execution of the first instance of the virtual space causes the first instance of the first virtual object be perceived in a second manner in the first instance of the virtual space, the second manner being different from the first manner;

executing the first instance of the virtual space, wherein executing the first instance of the virtual space includes implementing either the first file or the second file, the first instance of the virtual space being implemented to facilitate participation by a player in the first instance of the virtual space via a computing platform associated with the player, wherein the property value for the first property of the first instance of the first virtual object in the executed first instance of the virtual space is determined based on the selection of either the first file or the second file;

effectuating presentation of an editing interface configured to facilitate selection of files by administrators of the virtual space, the editing interface including:

one or more layers that correspond to file groups, a given file group including a set of files that store different property values for one or more virtual object properties that are associated commonly between individual files in the set of files, wherein a given layer corresponding to the given file group is selectable by an administrator to facilitate making further selections of the different files within the set of files; and wherein the editing interface includes a first layer corresponding to a first file group, the first file group including the first file and the second file, wherein the first layer is selectable by the administrator to facilitate making a further selection of the first file or the second file to define the property value of the first property of the first instance of the first virtual object by either the first value or the second value; and tracking player behavior within the virtual space and associating changes in player behavior with changes in property values of virtual object properties, the associations guiding future selections of individual property values among multiple property values available for individual virtual object properties of one or more other virtual objects, the future selections being made for one or more other players of the virtual space to elicit one or more behaviors from the one or more other players in the virtual space, including, responsive to tracking the player's behavior and determining a first behavioral change when the property value of the first property of the first instance of the first virtual object is changed from the first value to the second value, associating the first behavioral change with the change in the property value of the first property, the association guiding a first future selection of an individual property value from among a first set of property values for a second property of a second virtual object, the first future selection being made for a second player participating in a second instance of the virtual space to elicit one or more behaviors from the second player.

8. The method of claim 7, wherein the editing interface is further configured to present one or more of:

an identification of one or more instances of one or more virtual objects that are implemented in a given instance of the virtual space;

one or more of the virtual object properties of the instance of the one or more virtual objects; or property values associated with individual ones of one or more virtual object properties according to selected files; such that the editing interface is further configured to present an identification of the first instance of the first virtual object in the first instance of the virtual space, the first property, and a third value for the first property, the third value determined based on a selection of a third file that stores the third value for the first property.

9. The method of claim 8, wherein the editing interface is further configured to receive selection by the administrator of the first file for overriding the third value with the first value to effectuate a change in the first property of the first instance of the first virtual object in the first instance of the virtual space.

10. The method of claim 9, wherein the editing interface is further configured such that the selection by the administrator of the first file is visually indicated on the editing interface.

11. The method of claim 7, wherein the editing interface is further configured to receive selection by the administrator of the second file for overriding the third value with the second value to effectuate a change in the first property of the first instance of the first virtual object in the first instance of the virtual space.

12. The method of claim 7, wherein the editing interface is further configured such that a portion of the editing interface that displays property values for virtual objects properties that are commonly associated with files of a file group are visually highlighted in response to a selection of a layer that corresponds to the file group.

13. The system of claim 1, wherein the editing interface is further configured such that selection by the administrator of the first file or the second file is further configured to define the value of the first property for one or more other instances of the first virtual object in one or more other instances of the virtual space, the other instances of the virtual space being associated with other players.

14. The system of claim 13, wherein the one or more other instances of the first virtual object includes a second instance of the first virtual object, the second instance of the first virtual object being implemented in another instance of the virtual space.

15. The system of claim 1, wherein tracking player behavior comprises tracking player purchases of virtual objects through a virtual shop, and wherein eliciting one or more behaviors comprises eliciting purchases of virtual objects through the virtual shop.

16. The system of claim 15, wherein the one or more physical processors are further configured by machine-readable instructions to:
present offers to sell instances of virtual objects to players in the virtual shop, such that a first offer to sell the first instance of first virtual object is presented to the player based on the first property being defined by the first value, and a second offer to sell the first instance of the first virtual object is presented to the player based on the first property being defined by the second value; and
wherein the first behavioral change is determined based on whether the player executes the first offer or the second offer.

17. The method of claim 7, wherein the editing interface is further configured such that selection by the administrator of the first file or the second file is further configured to define the value of the first property for one or more other instances of the first virtual object in one or more other instances of the virtual space, the other instances of the virtual space being associated with other players.

18. The method of claim 13, wherein the one or more other instances of the first virtual object includes a second instance of the first virtual object, the second instance of the first virtual object being implemented in another instance of the virtual space.

19. The method of claim 7, wherein tracking player behavior comprises tracking player purchases of virtual objects through a virtual shop, and wherein eliciting one or more behaviors comprises eliciting purchases of virtual objects through the virtual shop.

20. The method of claim 19, further comprising:
presenting offers to sell instances of virtual objects to players in the virtual shop, including presenting a first offer to sell the first instance of first virtual object to the player based on the first property being defined by the first value, and presenting a second offer to sell the first instance of the first virtual object the player based on the first property being defined by the second value; and
wherein the first behavioral change is determined based on whether the player executes the first offer or the second offer.

21. The system of claim 1, wherein the first file is one of an RDF, XML, or JSON file, and the second file is one of an RDF, XML, or JSON file.

22. The method of claim 7, wherein the first file is one of an RDF, XML, or JSON file, and the second file is one of an RDF, XML, or JSON file.

* * * * *